United States Patent [19]

Choiniere

[11] Patent Number: 4,907,927

[45] Date of Patent: Mar. 13, 1990

[54] LOCKING PLATE FOR FASTENING INSULATION

[75] Inventor: Stanley W. Choiniere, Southwick, Mass.

[73] Assignee: Olympic Manufacturing Group, Inc., Agawam, Mass.

[21] Appl. No.: 262,584

[22] Filed: Oct. 26, 1988

[51] Int. Cl.$^4$ ............................................. F16B 43/00
[52] U.S. Cl. .................................... 411/368; 411/533; 411/396; 52/410; 52/512
[58] Field of Search ................................ 411/185–189, 411/531, 533, 542, 368, 369, 371, 372, 396; 52/410, 512

[56] References Cited

U.S. PATENT DOCUMENTS

| | | | |
|---|---|---|---|
| 4,630,984 | 12/1986 | Reinwall et al. | 411/368 |
| 4,663,910 | 5/1987 | Hasan | 52/410 |
| 4,712,959 | 12/1987 | Hasan | 52/512 X |
| 4,757,661 | 7/1988 | Hasan | 52/512 X |
| 4,763,456 | 8/1988 | Giannuzzi | 52/410 |
| 4,780,039 | 10/1988 | Hartman | 52/410 X |
| 4,781,503 | 11/1988 | Bögel | 411/368 |

Primary Examiner—Rodney M. Lindsey
Assistant Examiner—F. Saether
Attorney, Agent, or Firm—Chilton, Alix & Van Kirk

[57] ABSTRACT

A locking plate which is adapted for fastening insulation to a roof deck employs a locking grommet which snaps into the roofing plate and seats the head of the fastener. The locking grommet locks the fastener to the plate and maintains a constant fixed relationship at all times between the fastener head and the locking plate thereby preventing the head from popping up above the plate.

4 Claims, 1 Drawing Sheet

U.S. Patent        Mar. 13, 1990        4,907,927
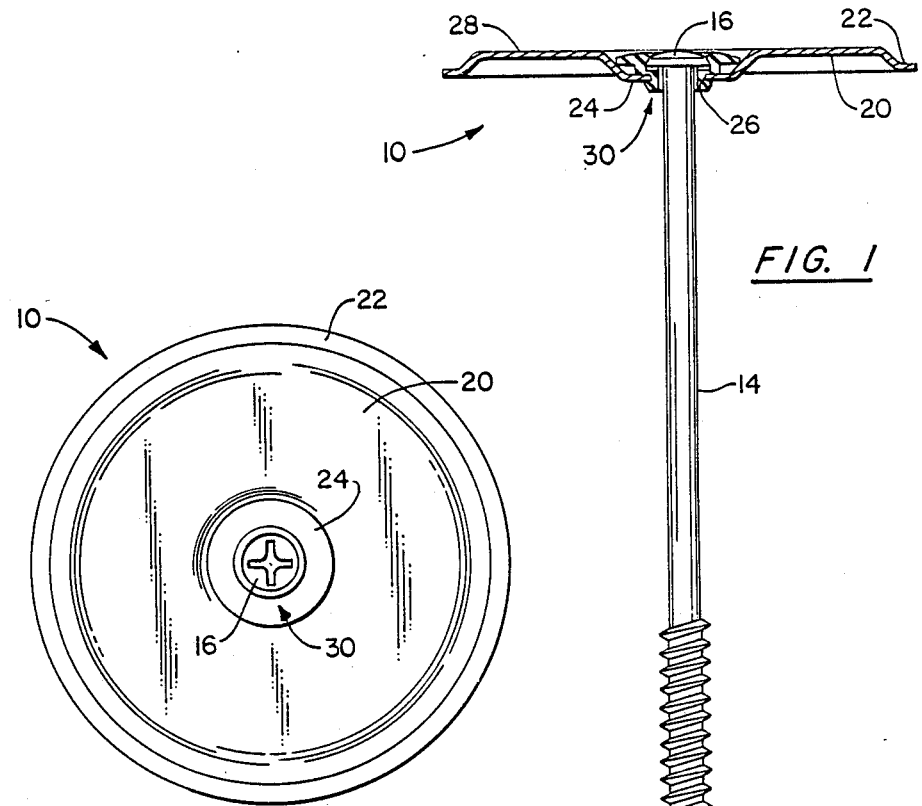
FIG. 1
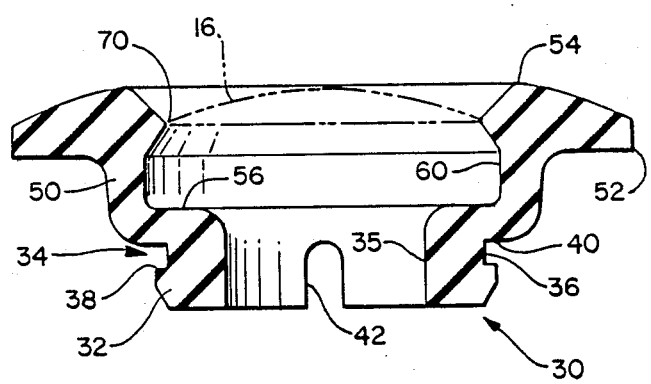
FIG. 2
FIG. 3

LOCKING PLATE FOR FASTENING INSULATION

BACKGROUND OF THE INVENTION

This invention relates generally to plates which are employed for fastening insulation. More particularly, this invention relates to metal plates which are used in connection with an elongated threaded fastener for securing insulation to a roof deck.

It is conventional for insulation to be fastened to the deck of a roof by threaded fasteners which extend through a steel roofing plate and thread into the deck to fasten the insulation in position. Over a period of time, due to the spongy nature of the roof and other factors such as insulation shrinkage and compression, the head and upper portion of the threaded fastener will frequently pop up through the roofing plate. The shrinkage or compression of the insulation may be typically on the order of ¼ inch.

BRIEF SUMMARY OF THE INVENTION

Briefly stated, the invention in a preferred form, is a locking plate which locks with a conventional fastener for fastening insulation to a roof deck. The locking plate comprises a plate and a locking grommet. The grommet comprises a locking collar and a receptacle for locking the fastener head to the plate. The locking collar defines an axial opening which is dimensioned to receive the fastener. The collar is insertable through the plate opening and has opposing axially spaced shoulders which retainably capture the plate as the collar is axially forced or snapped into the opening. The receptacle defines a seat axially spaced from the shoulders of the collar. The receptacle also comprises a locking nib axially spaced from the seat. The locking nib defines a restriction having a diameter less than the corresponding diameter of the fastener head. The fastener head is insertable into the grommet and is engagable against the seat and lockably engaged by the locking nib to thereby lock the fastener head in axially fixed relationship with the plate.

The locking collar in one embodiment has a pair of diametral axial slots. The nib comprises an inwardly projecting circular ridge. The plate is preferably formed of metal and the grommet is preferably formed of a plastic material. The plate further comprises an upper surface portion. The grommet is dimensioned so that when the locking collar captures the plate, the locking receptacle has a top surface which is approximately coplanar with the upper surface portion of the plate.

An object of the invention is to provide a new and improved locking plate for fastening insulation to a roof deck.

Another object of the invention is to provide a new and improved locking plate having means for locking the retaining plate to the fastener head so that the fastener does not project above the plate after the plate is installed.

A further object of the invention is to provide a new and improved insulation retaining plate wherein the head of the fastener is locked to the plate in an efficient and low cost manner.

Other objects and advantages of the invention will become apparent from the drawings and specifications.

BRIEF DESCRIPTION OF THE DRAWINGS

FIG. 1 is a side sectional view of a locking plate in accordance with the present invention together with an associated insulation fastener illustrated in a side view;

FIG. 2 is a top plan view of the locking plate and fastener of FIG. 1; and

FIG. 3 is an enlarged fragmentary sectional view of the locking grommet of FIG. 1.

DETAILED DESCRIPTION OF THE INVENTION

With reference to the drawings wherein like numerals represent like parts throughout the several figures, a locking plate in accordance with the present invention is generally designated by the numeral 10. The locking plate is employed in conjunction with an elongated threaded fastener 14 having a head 16 for securing insulation to the deck of a roof (not illustrated). In a preferred application, a locking plate 10 is further adapted, as will be described below, to prevent the fastener head 16 from popping above the plate after the locking plate 10 and fastener 14 are installed in position to secure insulation to the roof deck.

The locking plate 10 comprises a metal roofing plate 20 of generally conventional form and functional and a locking grommet 30 which is coupled to the plate for locking the fastener head in position to the plate. The plate 20 includes a circumferential recessed engagement flange 22 and a central recessed portion 24 having a circular opening 26 for receiving the fastener. The central recessed portion 24 is dimensioned so that the fastener head 16 upon installation may be received and seated in the locking grommet 30 whereby the head 16 does not extend above the upper surface 28 of the plate.

With additional reference to FIG. 3, the locking grommet 30 is a one-piece member which is generally symmetric about a central axis through the grommet. The grommet includes a lower collar 32 which defines an outer annular recess 34 and an inner axial opening 35 dimensioned to receive the shank of the fastener 14. The recess 34 is defined by an exterior cylindrical catch surface 36 and opposing shoulders 38 and 40. The surface 36 has a diameter which is slightly less than the diameter of the opening 26 of the plate 20. Shoulder 38 extends transversely circumferentially of the collar and has a relatively small transverse dimension which together with the diameter of the surface 36 is slightly greater than the diameter of opening 26.

Two diametrically opposed axial slots 42 are formed in the collar to allow for a limited degree of flexure. The collar 32 of the grommet is thus insertable through the opening of the plate in a snap-type fashion until the opening defining portions of the plate clear the peripheral edge of the shoulder 38 and the plate is cooperatively captured in the recess 34 between shoulder 38 and upper shoulder 40. The locking grommet 30 is preferably formed of polypropylene or a nylon material which allows for limited flexure and subsequent resilient transformation to the original state as depicted in FIG. 3.

The upper portion of the locking grommet 30 forms an enlarged locking receptacle 50 which receives, seats and captures the fastener head 16 in locked relationship. The receptacle 50 is dimensioned so that its peripheral circumferential edge 52 engages the tapered portion of the central recess of the plate, and the upper surface 54 of the receptacle is generally coplanar with the upper surface 28 of the plate when the locking grommet is coupled in position to the plate by the lock collar as previously described.

The receptacle forms an interior annular transverse seat 56 which is dimensioned to seat and closely engage the underside of the fastener head 16. The peripheral surface of the fastener head is closely received by a corresponding interior cylindrical wall 60 of the head. An inwardly projecting locking ring 70 is located axially above the seat and is generally equidistantly spaced from the seat. The locking ring has an interior diameter which is slightly less than the diameter of the cylindrical wall 60 and less than that of the corresponding diameter of the fastener head 16. The locking ring 70 is configured as an inward restriction which functions as a retaining nib.

As previously indicated, the locking grommet has a limited degree of flexure. The locking grommet has sufficient flexibility to allow for a slight deformation so that the fastener head 16 may be driven past the locking ring for seating against the annular seat 56. The fastener may be oriented at a slight angle during installation to facilitate reception and seating by the grommet locking receptacle. Once seated, the locking rim 70 engages the upper surface of the fastener head 16 so that fastener head is essentially captured by the receptacle between the seat 56 and the ring 70. Consequently, it will be appreciated that the fastener is secured or locked to the grommet and to the plate through the locking engagement of the grommet collar 30.

During installation, the fastener 14 is initially inserted into the grommet mouth. The fastener 14 is driven so that the fastener head 16 is lockingly seated in the locking grommet which has preferably already been coupled to the roofing plate. It will be appreciated that the fastener head is essentially locked to the plate. Thus, the fastener head will not pop up above the locking plate over a period of time as is common with conventional fastener/plate installations. The locking plate 10 will essentially maintain a fixed relationship with the fastener head 16 regardless of the sponginess of the roof or the compressibility of the insulation or other similar factors which tend over time to transform the relationship of the fastener head and the upper surface of the insulation.

While a preferred embodiment of the foregoing locking plate has been set forth for purposes of illustration, the foregoing description should not be deemed a limitation of the invention herein. Accordingly, various modifications, adaptations, and alternatives may occur to one skilled in the art without departing from the spirit and the scope of the present invention.

I claim:

1. A locking plate for locking with an associated fastener having a shank and a head including a top surface comprising:
   plate means comprising a plate having a planar annular top surface and a central portion recessed from said top surface and having a tapered sidewall and a bottom portion defining a central opening; and
   locking grommet means comprising a locking collar and a locking receptacle for locking said fastener head to said plate means,
   said locking collar defining an axial opening dimensioned to receive said fastener shank, said locking collar being insertable through said plate opening and having opposing axially spaced shoulders for retainably capturing said plate means as said collar is axially forced into said plate opening,
   said locking receptacle having a top surface and a peripheral circumferential edge which engages said sidewall along a circular interface spaced from said plate bottom portion, said receptacle defining a seat axially spaced from said shoulders and comprising a locking nib axially spaced from said seat and defining a restriction having a diameter less than the corresponding diameter of the fastener head so that when said plate means is captured by said locking collar, said fastener is insertable in said grommet means and said head is engageable against said seat and lockably engageable by said locking nib to thereby lock the fastener head in axially fixed relationship with the plate means, so that said locking receptacle top surface, said plate top surface and said fastener head top surface are substantially co-planar.

2. The locking plate of claim 1 wherein said locking collar defines a pair of diametral axial slots.

3. The locking plate of claim 1 wherein said nib comprises an inwardly projecting circular ridge.

4. The locking plate of claim 1 wherein said plate means is formed of metal and said locking grommet means is formed of a plastic material.

* * * * *